United States Patent
Nakagawa

[11] Patent Number: 5,836,288
[45] Date of Patent: Nov. 17, 1998

[54] METHOD AND APPARATUS FOR CONTROLLING FUEL INJECTION IN A MULTICYLINDER INTERNAL COMBUSTION ENGINE

[75] Inventor: Norihisa Nakagawa, Numazu, Japan

[73] Assignee: Toyota Jidosha Kabushiki Kaisha, Aichi-ken, Japan

[21] Appl. No.: 895,178

[22] Filed: Jul. 16, 1997

[30] Foreign Application Priority Data

Jul. 18, 1996 [JP] Japan ..................................... 8-189439

[51] Int. Cl.⁶ ....................................................... F02D 41/06
[52] U.S. Cl. ...................................... 123/491; 123/179.16
[58] Field of Search ............................. 123/179.16, 491; 701/113

[56] References Cited

U.S. PATENT DOCUMENTS

| | | | |
|---|---|---|---|
| 5,390,641 | 2/1995 | Yamada et al. | 123/491 |
| 5,482,023 | 1/1996 | Hunt et al. | 123/491 |
| 5,542,393 | 8/1996 | Katoh et al. | 123/491 |
| 5,590,633 | 1/1997 | Tomisawa et al. | 123/491 |
| 5,595,161 | 1/1997 | Ott et al. | 123/491 |
| 5,690,075 | 11/1997 | Tanaka et al. | 123/491 |

FOREIGN PATENT DOCUMENTS

| | | |
|---|---|---|
| 61-31635 | 2/1986 | Japan . |
| 3-185239 | 8/1991 | Japan . |
| 5-5440 | 1/1993 | Japan . |

Primary Examiner—Tony M. Argenbright
Attorney, Agent, or Firm—Kenyon & Kenyon

[57] ABSTRACT

The present invention provides an apparatus and a method for controlling fuel injection in a multicylinder internal combustion engine to prevent discharge of unburned HC and purify the exhaust gas at the engine start-up. The apparatus controls the opening of fuel injection valves by a drive circuit for a period of time on the basis of a cranking amount TAUST determined corresponding to the engine conditions at the start of the engine and a post-cranking amount TAU determined corresponding to the engine conditions after the engine is started. The apparatus detects completion of fuel injections at the start of the engine by detecting that the cranking amount TAUST has been injected once to each cylinder and switches the fuel injection amount from the cranking amount TAUST to the post-cranking amount TAU after detecting the completion of the above fuel injections.

6 Claims, 15 Drawing Sheets

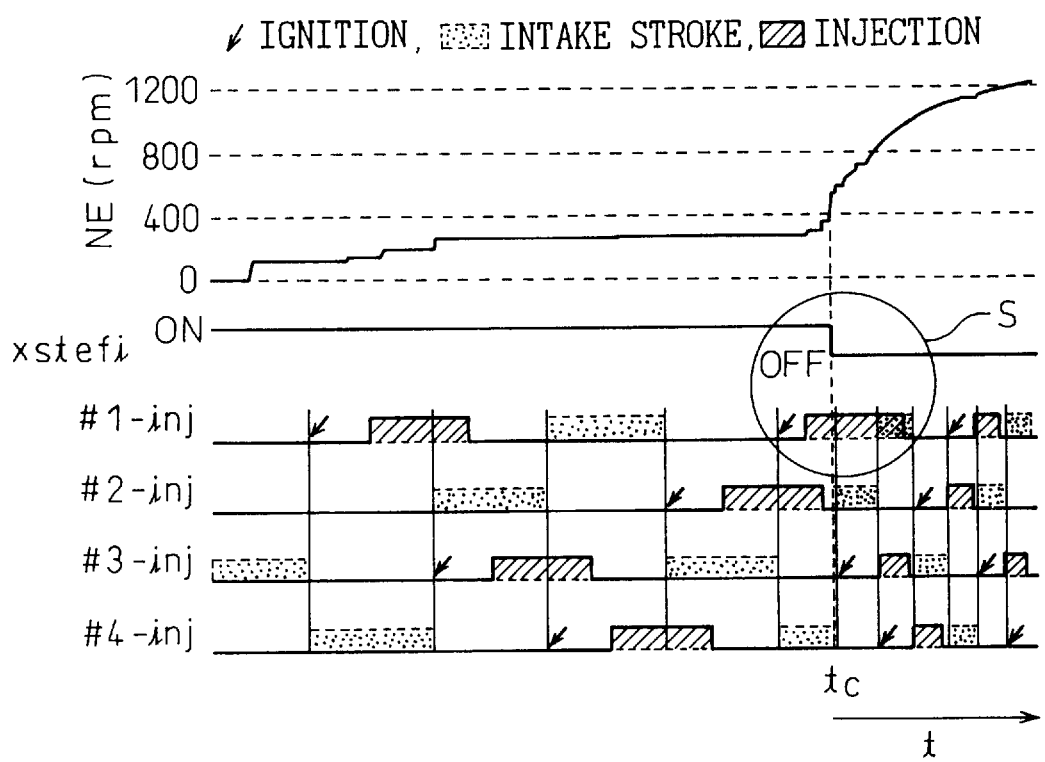

METHOD AND APPARATUS FOR CONTROLLING FUEL INJECTION IN A MULTICYLINDER INTERNAL COMBUSTION ENGINE

BACKGROUND OF THE INVENTION

1. Field of the Invention

The present invention relates to a method and an apparatus for controlling fuel injection in a multicylinder internal combustion engine, more particularly, to a method and an apparatus for controlling fuel injection in a multicylinder internal combustion engine, to inject different fuel amounts at and after the start of the engine and to prevent discharging of unburned HC due to excess fuel supply occurring during a period when the fuel amount to inject is switched from a cranking amount to a post-cranking amount.

2. Description of the Related Art

A prior art for controlling fuel injection in an internal combustion engine determines whether or not the speed of the engine is above a reference speed which is predetermined so that the engine can maintain rotation by its own power without using a self-starting motor. If the engine speed is above the reference speed, the art switches the fuel amount to inject from a cranking amount TAUST for starting the engine to a post-cranking amount TAU, which is calculated according to an engine load, an engine speed, etc., and is used after the engine is started. When calculating the cranking amount TAUST, residual fuel which is a leakage from a fuel injection valve into an intake duct is taken into consideration, that is, TAUST is calculated by subtracting residual fuel from a required amount. The residual fuel, in general, is obtained by an assumption, therefore, if a small amount is assumed as a residual fuel, subtraction becomes insufficient and extra fuel is supplied resulting in an engine start up failure due to the unburned HC discharge.

To solve this problem, an apparatus for controlling fuel injection in an internal combustion engine disclosed in the Japanese Patent Publication No. 5-5440 alternatively injects fuel amount based on TAUST or stops injection for each determined period until the engine reaches to the reference speed explained above after the engine is started and switches the fuel amount to inject from the cranking amount TAUST to the post-cranking amount TAU after the engine has reached to the reference speed to thereby improve the startability of the engine.

However, according to the above apparatus, until the engine reaches the reference speed after TAUST has been infected once to each cylinder, TAUST, which is larger than TAU, is successively injected to the cylinders, thus extra fuel amount is supplied and the discharge amount of unburned HC is increased, resulting in deterioration of the exhaust emission.

SUMMARY OF THE INVENTION

The present invention has been made in view of the foregoing problems and it is therefore an object of the invention to provide a method and an apparatus for controlling fuel injection in a multicylinder internal combustion engine to prevent discharging of unburned HC due to excess fuel supply occurring during a period when the fuel amount to inject is switched from a cranking amount to a post-cranking amount, thereby improving the startability of the engine.

FIG. 1 is a diagram of a basic constitution according to a first aspect of the invention.

In order to accomplish the above object, according to a first aspect of the invention, there is provided an apparatus for controlling fuel injection in a multicylinder internal combustion engine that controls the opening of fuel injection valves 12 by a drive circuit 50 for a period of time on the basis of a cranking amount TAUST determined corresponding to the engine conditions at the start of the engine 1 and a post-cranking amount TAU determined corresponding to the engine conditions after the engine is started, comprising:

a detecting means A for detecting a completion of fuel injections at the start of the engine by detecting that the cranking amount TAUST has respectively injected one to each cylinder; and a switching means B for switching the fuel injection amount from the cranking amount TAUST to the post-cranking amount TAU after the detecting means A has detected the completion of the fuel injections.

According to the first aspect of the invention, there is also provided a method for controlling fuel injection in a multicylinder internal combustion engine that controls the opening of fuel injection valves 12 for a period of time on the basis of a cranking amount determined corresponding to the engine conditions at the start of the engine 1 and a post-cranking amount determined corresponding to the engine conditions after the engine is started, comprising the steps of:

detecting a completion of fuel injections at the start of the engine by detecting that the cranking amount has been injected once to each cylinder; and switching the fuel injection amount from the cranking amount to the post-cranking amount after detecting the completion of the fuel injections.

The first aspect of the invention thus interrupts fuel injections based on the cranking amount TAUST right after the detecting means A detects that each fuel injection to each cylinder based on TAUST has completed once, then the switching means B switches the fuel injection amount from the cranking amount TAUST to the post-cranking amount TAU, thereby avoiding extra fuel supply at the start of the engine, reducing the unburned HC discharge and better purifying the exhaust gas discharged from the engine.

FIG. 2 is a diagram of a basic constitution according to a second aspect of the invention.

In order to accomplish the above object, according to a second aspect of the invention, there is provided an apparatus for controlling fuel injection in a multicylinder internal combustion engine that controls the opening of fuel injection valves 12 by a drive circuit 50 for a period of time on the basis of a cranking amount TAUST determined corresponding to the engine conditions at the start of the engine 1 and a post-cranking amount TAU determined corresponding to the engine conditions after the engine is started, comprising:

a first detecting means C for detecting a completion of fuel injections at the start of the engine by detecting that the cranking amount TAUST has been injected once to each cylinder;

a temporary switching means D that switches the fuel injection amount from the cranking amount TAUST to the post-cranking amount TAU to at least one of cylinders after the first detecting means C has detected the completion of the fuel injections;

a second detecting means E for detecting that the engine start-up has been completed after the fuel injection amount is temporarily switched by the temporary switching means D; and a continuing means F for continuing the fuel injections based on the cranking amount TAUST until the second detecting means E detects the completion of the engine start-up.

According to the second aspect of the invention, there is also provided a method for controlling fuel injection in a multicylinder internal combustion engine that controls the opening of fuel injection valves 12 for a period of time on the basis of a cranking amount determined corresponding to the engine conditions at the start of the engine 1 and a post-cranking amount determined corresponding to the engine conditions after the engine is started, comprising the steps of:

detecting a completion of fuel injections at the start of the engine by detecting that the cranking amount has been injected once to each cylinder;

temporarily switching the fuel injection amount from the cranking amount to the post-cranking amount to at least one of cylinders after detecting the completion of the fuel injections;

detecting the engine start-up completion after the fuel injection amount is temporarily switched from the cranking amount to the post-cranking amount; and continuing the fuel injections based on the cranking amount until the completion of the engine start-up is detected.

The second aspect of the invention, thus, performs the first four injections based on the cranking amount TAUST once to each cylinder, after detecting the first four injections by the first detecting means C, the invention performs at least the next one of the injections based on the post-cranking amount TAU by the temporary switching means D, then after performs injections based on the cranking amount TAUST by the continuing means F until the completion of the engine start-up is detected by the second detecting means E, and performs injections based on the post-cranking amount TAU after the completion of the engine start-up is detected by the second detecting means E. As a result, excess fuel is not supplied to one or more cylinders after the first four injections so that discharge of unburned HC may be reduced and the exhaust emission is better purified. Furthermore, when a large amount of fuel is required for the cranking amount TAUST in the case that a large amount of fuel is deposited on the wall in the intake port due to deterioration with age, low battery voltage, poor fuel or the like, a required amount of fuel can be supplied without shortage, thereby avoiding failure in the engine start-up due to lack of fuel.

FIG. 3 is a diagram of a basic constitution according to a third aspect of the invention.

In order to accomplish the above object, according to a third aspect of the invention, there is provided an apparatus for controlling fuel injection in a multicylinder internal combustion engine that controls the opening of fuel injection valves 12 by a drive circuit 50 for a period of time on the basis of a cranking amount TAUST determined corresponding to the engine conditions at the start of the engine 1 and a post-cranking amount TAU determined corresponding to the engine conditions after the engine is started, comprising:

a detecting means G for detecting that the engine start-up has been completed;

a judging means H for judging whether the post-cranking amount TAU of fuel has been injected when the completion of the engine start-up is detected by the detecting means G and during the cranking amount TAUST of fuel is being injected; and a stop means I for immediately stopping the fuel injection based on the cranking amount TAUST when the judging means H judges that the post-cranking amount TAU has been injected, and for stopping the fuel injection based on the cranking amount TAUST when the post-cranking amount TAU has been injected when the judging means H judges that the post-cranking amount TAU has not yet been injected.

According to the third aspect of the invention, there is also provided a method for controlling fuel injection in a multicylinder internal combustion engine that controls the opening of fuel injection valves 12 for a period of time on the basis of a cranking amount determined corresponding to the engine conditions at the start of the engine 1 and a post-cranking amount determined corresponding to the engine conditions after the engine is started, comprising the steps of:

detecting that the engine start-up has been completed;

judging whether the post-cranking amount of fuel has been injected when the completion of the engine start-up is detected and during the cranking amount of fuel is being injected;

immediately stopping the fuel injection based on the cranking amount if it is judged that the post-cranking amount has been injected at the time the completion of the engine start-up is detected; and stopping the fuel injection based on the cranking amount when the post-cranking amount has been injected if it is judged that the post-cranking amount has not yet been injected at the time the completion of the engine start-up is detected.

The third aspect of the invention judges whether the post-cranking amount TAU of fuel has been injected when the completion of the engine start-up is detected by the detecting means G and, during the cranking, if an amount TAUST of fuel is injected by the judging means H. If the result is affirmative, the third aspect stops the injection based on TAUST by the stop means I and, on the other hand, if the result is negative, stops the fuel injection based on TAUST after the post-cranking amount TAU has been injected by the stop means I. As a result, the invention reduces the discharge of unburned HC because the injection based on TAUST in the intake stroke is stopped when the engine start up completion is detected, and improves the engine startability because the cranking injection amount TAUST is continually injected until the engine is completely started.

BRIEF DESCRIPTION OF THE DRAWINGS

The present invention will be more clearly understood from the description as set forth below with reference to the accompanying drawings, wherein:

FIG. 15 is an example of an enlarged time chart showing a switching time of the fuel injection control according to a prior art;

DESCRIPTION OF THE PREFERRED EMBODIMENTS

The preferred embodiments of the present invention will be described below with reference to the accompanying drawings.

Figure 4:
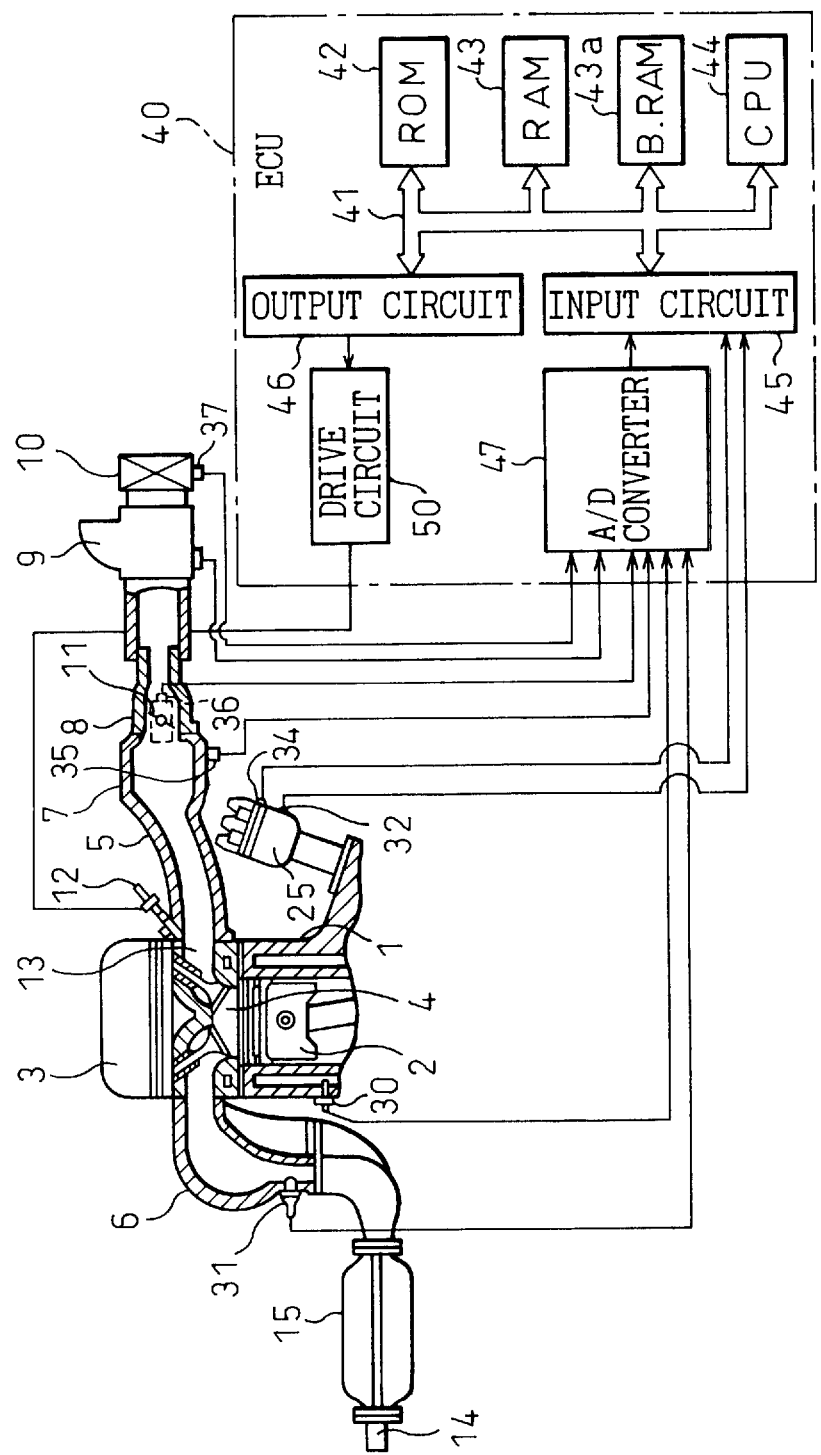
FIG. 4 is a diagram showing a general constitution of an embodiment according to the present invention.

FIG. 4 is a diagram showing a general constitution of an embodiment according to the present invention. In FIG. 4, the reference number 1 denotes an engine block, 2 denotes a piston, 3 denotes a cylinder head, 4 denotes a combustion chamber, 5 denotes an intake manifold and 6 denotes an exhaust manifold. The intake manifold 5 is connected to a surge tank 7, an intake duct 8, an air flow meter 9 and an air cleaner 10. A throttle valve 11 is provided in the intake duct 8. Injection valves 12 are provided in the intake manifold 5 to inject fuel toward the corresponding intake ports 13. The exhaust manifold 6 is connected to an exhaust pipe 14 in which a three-way catalytic converter 15 is provided for simultaneously purifying three contaminant such as HC, CO and $NO_x$.

An electronic control unit 40 may be a digital computer system having a ROM 42, a RAM 43, a backup RAM 43a, a CPU 44, an input circuit 45, an output circuit 46 and a bidirectional bus 41 that connects these components to one another. The backup RAM 43a is provided for maintaining data stored therein for a while after battery power to the control unit 40 is lost.

Next, sensors for detecting the conditions of the engine and the input circuit 45, having a plurality of input ports, in the electronic control unit 40, for receiving signals from the sensors, will be explained. A water temperature sensor 30 detects the temperature THW of coolant in a water jacket of the cylinder block 1. An output signal from the sensor 30 is supplied to an input port in the circuit 45 through an A/D converter 47. The air flow meter 9 generates an output voltage proportional to the intake air amount and the output voltage is applied to the input circuit 45 through the A/D converter 47. An air-fuel ratio sensor 31 is arranged in the exhaust manifold 6 to detect an oxygen concentration in the exhaust gas, and the detected signal is supplied to the input circuit 45 through the A/D converter 47. Furthermore, an intake air pressure sensor 35 for detecting the air pressure in the intake duct 8, a throttle angle sensor 36 for detecting the opening TA of the throttle valve 11 and an intake air temperature sensor 37 for detecting the temperature TH of the intake air are provided, and outputs of these sensors are also supplied to the input circuit 45 through the A/D converter 47.

A crank angle sensor 32 is arranged in a distributor 25 to detect a crank angle of the engine. Namely, the sensor 32 generates an output pulse every 30 degrees in crank angle. A reference crank angle sensor 34 is also arranged in the distributor 25 to detect a reference crank angle of the engine. Namely, the sensor 34 generates two output pulses every 720 degrees in crank angle, that is, every two turns of the crank shaft of the engine, one at a top dead center TDC in the compression stroke of No. 1 cylinder, and the other at another top dead center TDC shifted 360 degrees in crank angle from TDC of No. 1 cylinder, in the compressing stroke of No. 4 cylinder. The output pulses of the sensor 34 are used for calculating a fuel injection timing and an ignition timing for each cylinder. The cylinder search for finding the next cylinder into which the fuel is to be supplied is performed with the use of the signals from the sensor 34, during which the crank shaft is turned twice, after the engine is started. These pulse signals from the sensors 32 and 34 are directly input to the input circuit 45.

On the other hand, an output section of the electronic control unit 40 involves the output circuit 46 having a plurality of output ports and drive circuits 50. The fuel injection valves 12 are respectively connected to the driving circuits 50 and are opened according to the fuel injection control explained later to insect fuel toward the corresponding intake ports 13.

A 4-cylinder engine will be explained as a preferred embodiment of the present invention below, however, the present invention can also be applied to a 6-cylinder engine or a 8-cylinder engine.

Figure 5A:
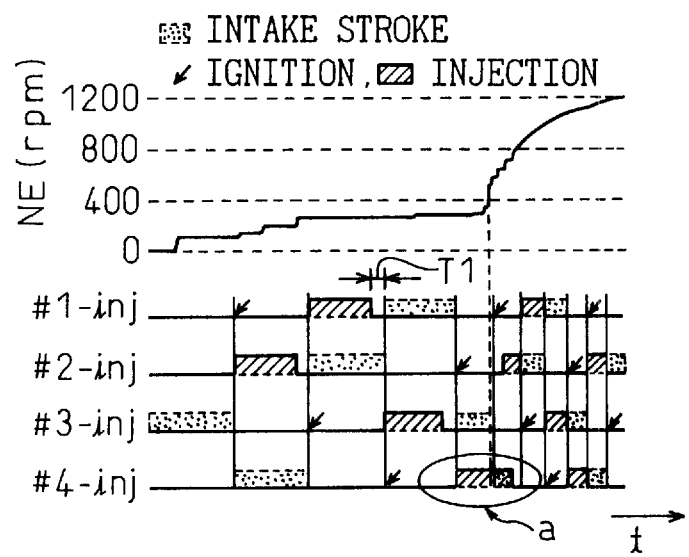
FIG. 5A is an example of a time chart of fuel injection control according to a prior art.
Figure 5B:
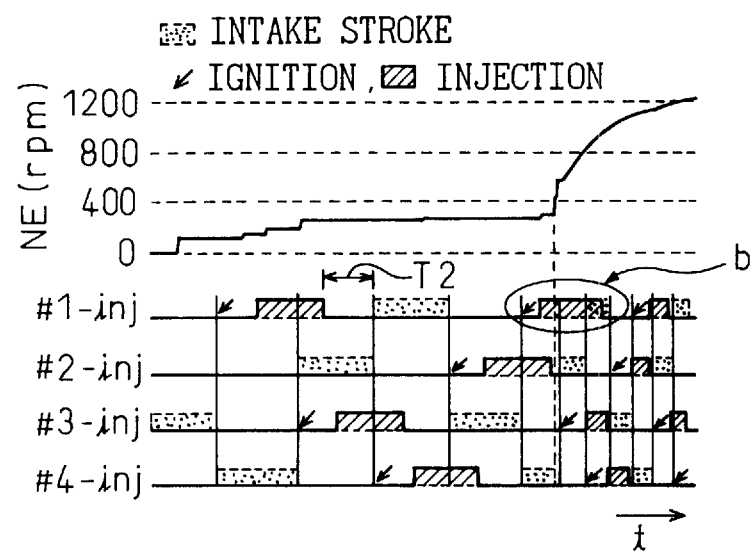
FIG. 5B is another example of the time chart shown in FIG. 5A, wherein the fuel injection start timing is advanced.
Figure 5C:
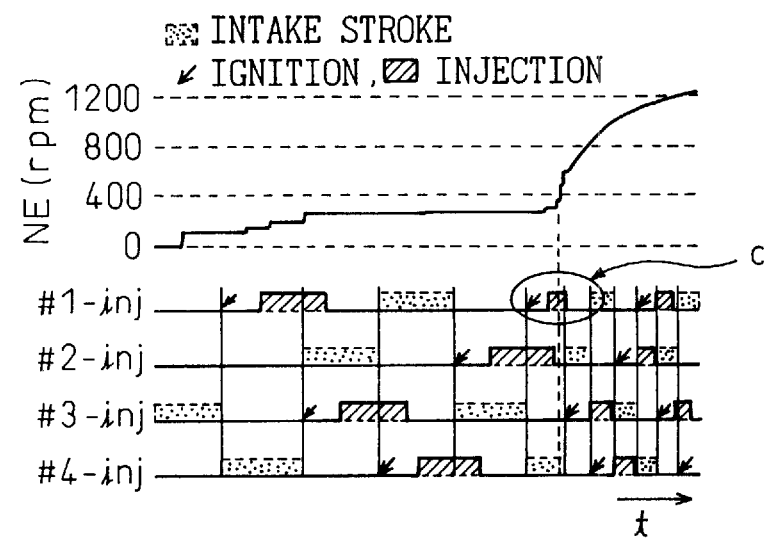
FIG. 5C is an example of a time chart of fuel injection control according to a first aspect of the present invention.

First, referring to FIGS. 5A to 5C, fuel injection control according to two prior arts and the first aspect of the present invention will be explained. FIG. 5A is an example of a time chart of fuel injection control according to a prior art. The prior art shown in FIG. 5A for controlling fuel injection in an internal combustion engine determines whether or not the speed of the engine is above a reference speed and, if it is above the reference speed, it switches the fuel injection amount from a cranking amount TAUST for starting the engine to a post-cranking amount TAU, which is calculated according to an engine load, an engine speed, etc., and is used after the engine is started. The reference speed is defined as a speed that the engine can maintain its speed by its own power without using a self-starting motor, so that if the engine speed is above the reference speed, it is regarded that the engine is in a self-driving state. FIG. 5B is another example of the time chart shown in FIG. 5A, wherein the fuel injection start timing is advanced. FIG. 5C is an example of a time chart of fuel injection control according to a first aspect of the present invention, which switches the fuel injection amount from the cranking amount TAUST to the post-cranking amount TAU regardless of the reference speed.

As shown in FIG. 5A, until the engine self-driving state is detected during the engine start-up time, namely, until the engine speed NE reaches 400 RPM, the cranking fuel amount TAUST is injected toward each intake port of the cylinders #2, #1, #3 and #4 in order from each corresponding injection valve. If the engine speed NE exceeds 400 RPM while fuel is being injected into #4 cylinder, however, the fuel injection based on TAUST is continued. In this case, in a period marked "a" in FIG. 5A, the injection period and the intake stroke of #4 cylinder overlap, thus the fuel injected during this period based on TAUST generates extra fuel HC and unburned HC is discharged after the start of the engine.

As shown in FIG. 5B, the fuel injection start timing is advanced (T1<T2) as compared with FIG. 5A so that the intake stroke and the injection period of each cylinder will not overlap, namely, the injection may be finished before the intake stroke starts. However, until the engine self-driving state is detected from the engine start-up time, namely, until the engine speed NE reaches 400 RPM, the cranking fuel amount TAUST is injected toward each intake port of the cylinders #1, #3, #4 and #2 in order from each corresponding injection valve. Then, the engine speed NE exceeds 400 RPM during fuel is injected into #1 cylinder, however, the fuel injection based on TAUST is continued. In this case, in a period marked "b", in FIG. 5B, the injection period and intake stroke of #1 cylinder are overlapped, thus the fuel injected during this period based on TAUST generates extra fuel HC and unburned HC is discharged after the start of the engine.

The fuel injection control according to the first aspect of the present invention shown in FIG. 5C switches the fuel injection amount from the cranking amount TAUST to the post-cranking amount TAU whenever the engine speed exceeds the reference speed so that the extra fuel HC will not be supplied to the cylinders. The cranking fuel amount TAUST is injected into each of cylinders #1, #3, #4 and #2 once in order from each corresponding injection valve, then switches the fuel injection amount from TAUST to TAU regardless of the engine speed. Therefore, while assuring the startability of the engine, the total amount of fuel injection until the completion of the engine start up is reduced as compared with the above prior arts. During a period marked "c" in FIG. 5C, the fuel injection to #1 cylinder is executed based on the post-cranking amount TAU to avoid the overlap between the intake stroke and the injection period, thereby reducing unburned HC discharge.

Figure 6:
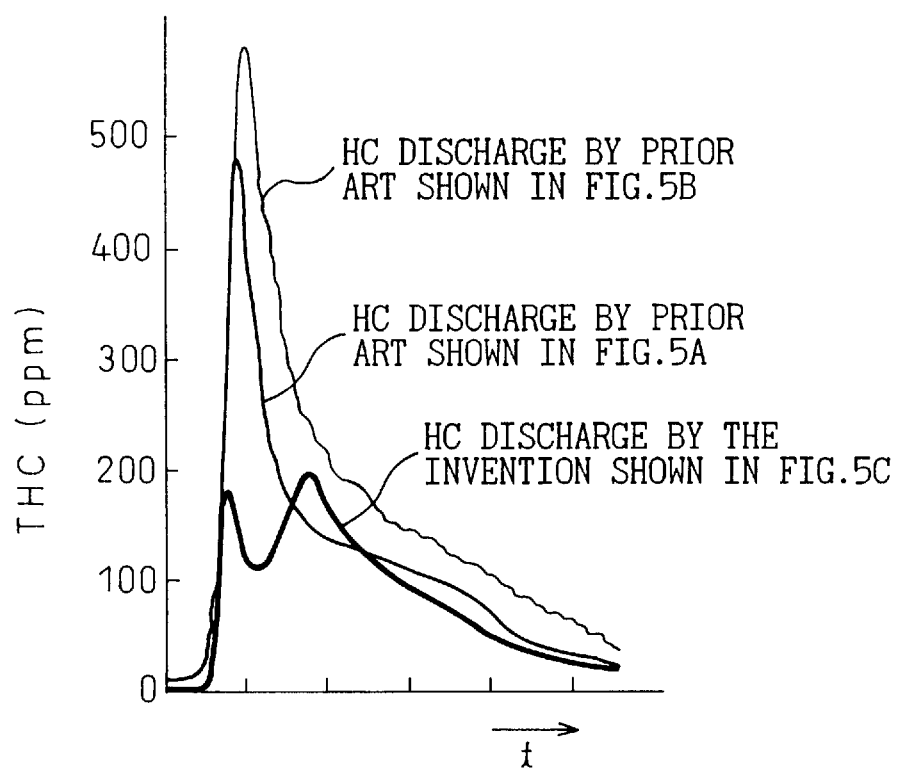
FIG. 6 is a graph showing each respective amount of discharged unburned HC measured when the fuel injection controls shown in FIGS. 5A, 5B and 5C are executed.

FIG. 6 is a graph showing each respective amount of discharged unburned HC measured when the fuel injection controls shown in FIGS. 5A, 5B and 5C are executed. In FIG. 6, the abscissa represents time, the ordinate represents the HC discharge amount THC (ppm) for all cylinders. From FIG. 6, it is understood that the HC discharge amount according to the first aspect of the invention is less than both of the prior arts. The injection control according to the first aspect of the invention will be explained in detail below.

Figure 1:
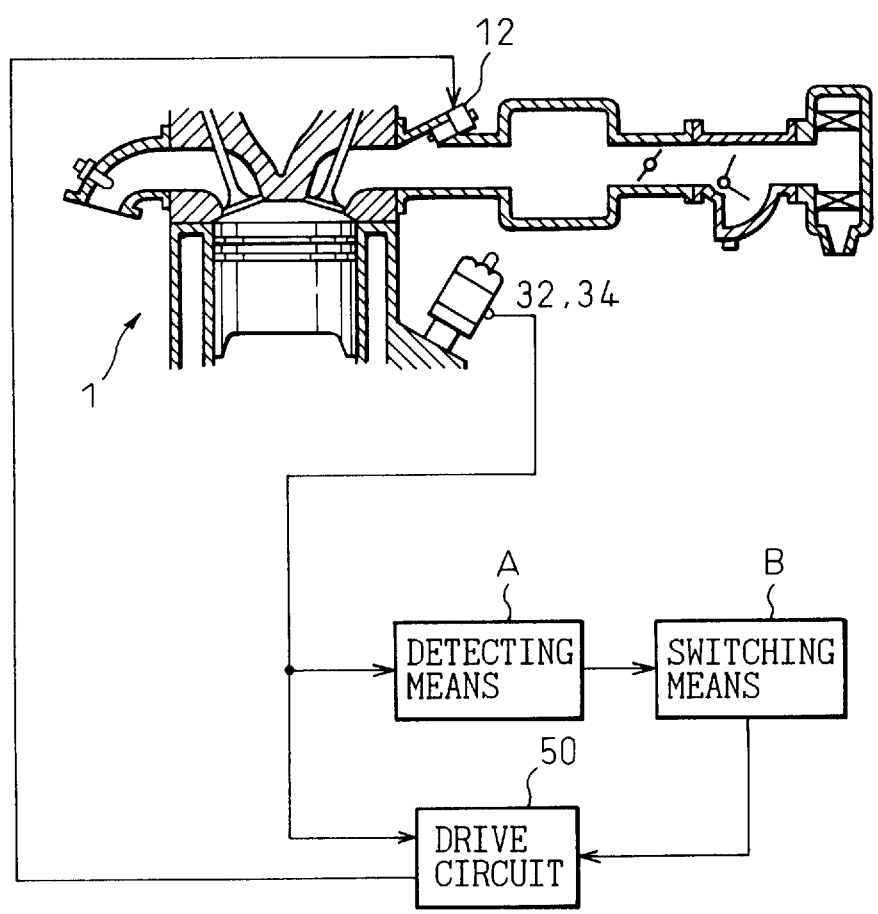
FIG. 1 is a diagram of a basic constitution according to a first aspect of the invention.
Figure 7:
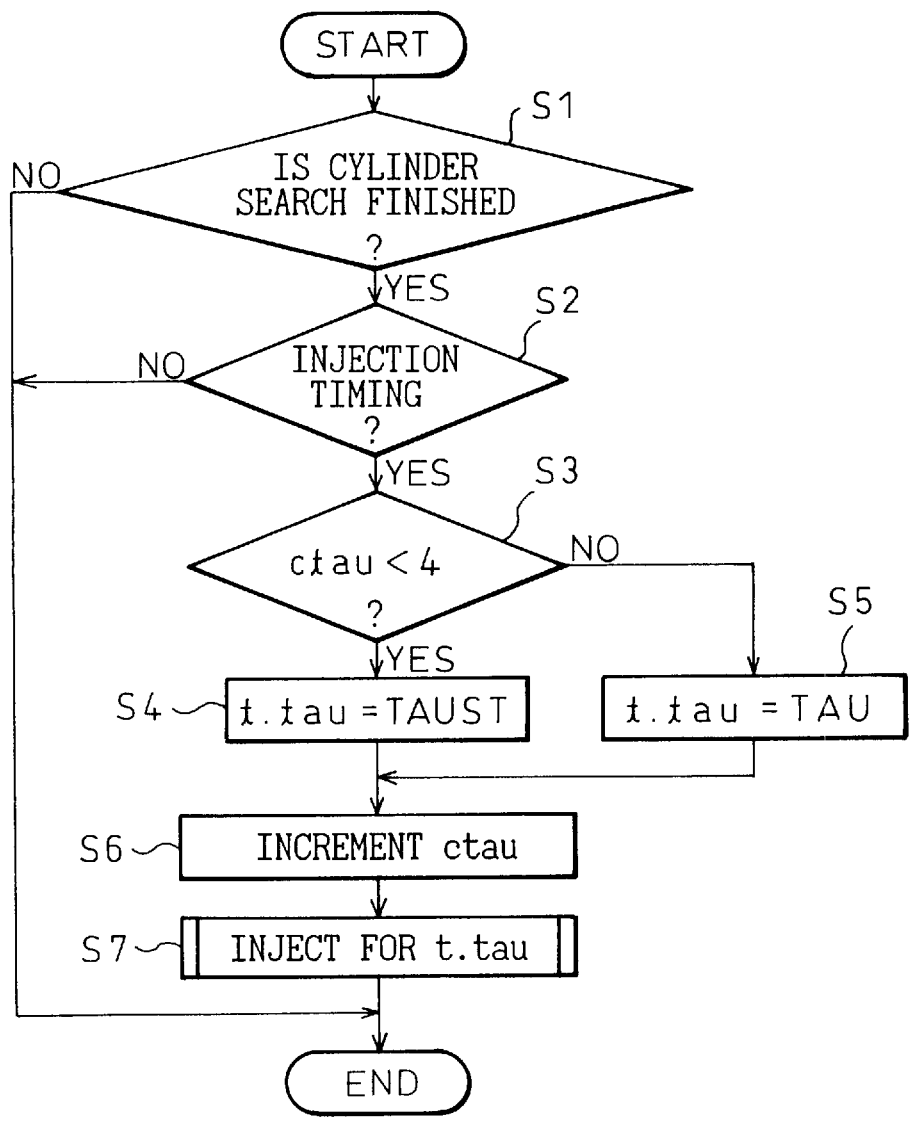
FIG. 7 is a flowchart of a fuel injection routine according to a first aspect of the invention.

FIG. 7 is a flowchart of a duel injection routine according to the first aspect of the invention. This routine is executed every time the input port receives a signal from the crank angle sensor 32, namely, every 30 degrees in crank angle (30° CA). Thus this routine is also called a 30 (degree) CA interrupt routine, and is started when the ignition switch is turned on and ends when the ignition switch is turned off. The detecting means A and the switching means B explained with reference to FIG. 1 are respectively carried out by executing step S3, and steps S4 and S5 respectively shown in FIG. 7.

In step S1, it is determined whether or not the cylinder search has been finished, namely, whether or not two pulse signals from the reference crank angle sensor 34 are received is checked to find out the rank shaft has rotated two turns. After the 30 CA interrupt routine is started, if it is determined that the cylinder search has been finished in step S1, the process proceeds to step S2, if not, the process ends.

In step S2, it is determined whether or not the searched cylinder is at the injection timing based on output signals of the crank angle sensor 32 and the reference crank angle sensor 34. If it is determined YES in step S2, the process proceeds to step S3, if not, the process ends.

In step S3, it is determined whether or not cranking injection based on TAUST in each cylinder has been completed once. This is accomplished by an injection execution counter ctau. If ctau<4 in step S3, the process proceeds to step S4, if ctau≧4 in step S3, the process proceeds to S5. In step S4, t.tau is calculated based on TAUST, then step S6 is proceeded. In step S5, t.tau is calculated based on TAU, then step S6 is proceeded.

In step S6, the injection execution counter ctau is incremented. The counter ctau is initially cleared when the ignition switch is turned on, and counts up every 30 degrees in crank angle after step S1 determined that the cylinder search has been finished. In step S7, the fuel injection amount t.tau calculated in S4 or S5 is injected from each injection valve into each corresponding cylinder.

Next, the fuel injection amount calculation routines will be explained below.

Figure 8:
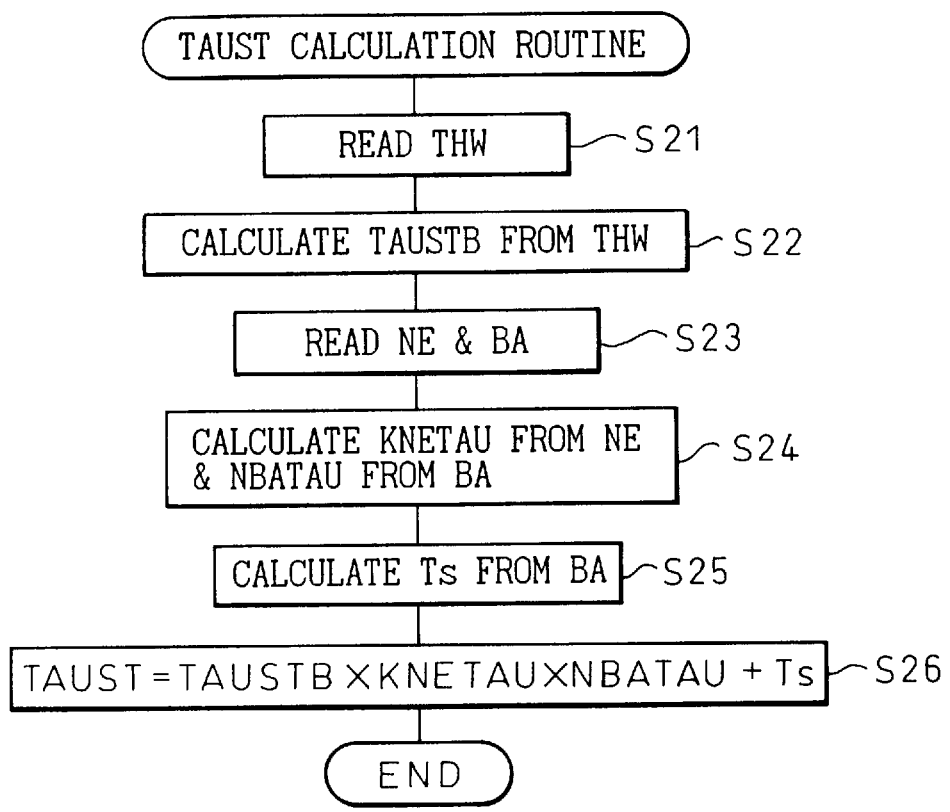
FIG. 8 is a flowchart of a TAUST calculation routine according to a first aspect of the invention.

FIG. 8 is a flowchart of a TAUST calculation routine according to the first aspect of the invention. The routine is carried out in the main routine, namely, the routine is executed every 1 milli-second (ms). In step S21, the temperature THW of coolant in the water jacket of the engine block 1 is read from the output of the water temperature sensor 30. In step S22, a basic fuel injection amount TAUSTB corresponding to the water temperature THW is read from a map stored in the ROM 42. In step S23, an engine speed NE from the crank angle sensor 32 as well as a battery voltage BA from an A/D converter (not shown) are read. In step S24, correction coefficients KNETAU and NBATAU each corresponding to an engine speed NE and a battery voltage BA are read from maps stored in the ROM 42. In step S25, an ineffective injection time Ts corresponding to a battery voltage BA is read from a map stored in the ROM 42. In step S26, a cranking injection amount TAUST is calculated as follows:

TAUST=TAUSTB*KENTAU*NBATAU+Ts  (ms)

Figure 9:
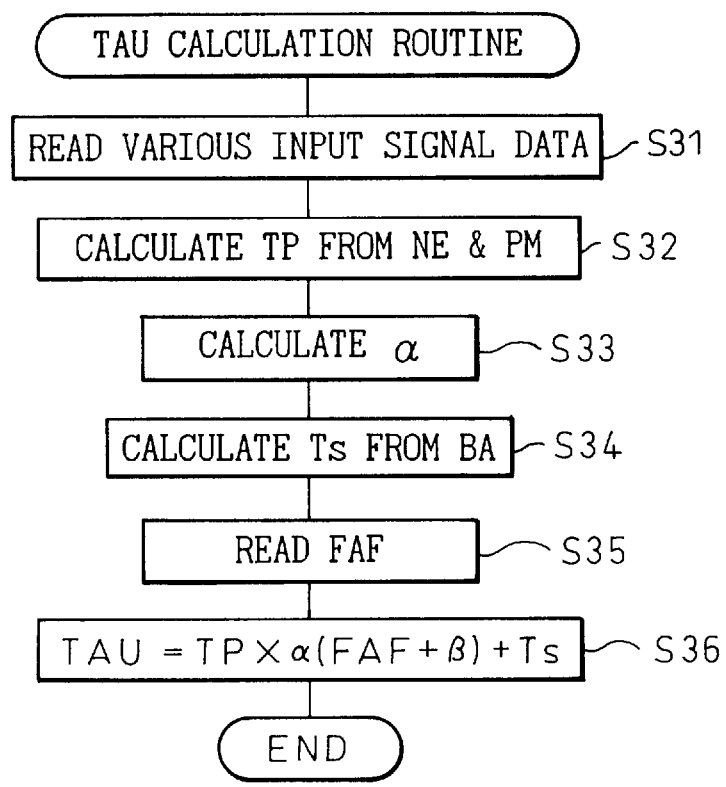
FIG. 9 is a flowchart of a TAU calculation routine according to a first aspect of the invention.

FIG. 9 is a flowchart of a TAU calculation routine according to the first aspect of the invention. The routine is carried out in the main routine. In step S31, various input signal data, such as an engine speed NE, an intake air pressure PM, a coolant water temperature THW, a throttle opening TA, an intake air temperature TH etc., are read. In step S32, a basic fuel injection amount TP corresponding to both an engine speed NE and an intake air pressure PM are read from a two dimensional map stored in the ROM 42. In step S33, a correction coefficient α is calculated based on the coolant water temperature THW, the throttle opening TA, the intake air temperature TH, etc. read in step S31. In step S34, an ineffective injection time Ts corresponding to a battery voltage BA is read from a map stored in the ROM 42. In step S35, an air-fuel ratio correction coefficient FAF calculated by executing another routine, that is an air-fuel ratio correction coefficient calculation routine (not explained), is read. The air-fuel ratio correction coefficient FAF is a feedback correction coefficient used with the output of the air-fuel ratio sensor 31 to calculate the fuel amount to inject to attain a target air-fuel ratio. In step S36, a post-cranking injection amount TAU is calculated as follows:

$$TAU = TP * K\alpha * (FAF + \beta) + Ts \quad (ms)$$

wherein, β is a correction coefficient other than the correction coefficient FAF.

As explained above, according to the first aspect of the invention, the detecting means A detects a completion of fuel injection by detecting that each fuel injection to each cylinder based on TAUST has been respectively completed once, and the switching means B switches the fuel injection amount from the cranking amount TAUST to the post-cranking amount TAU when the detecting means A detects the completion of the fuel injection. Therefore, extra fuel supply at the start of the engine can be avoided, the unburned HC discharge is reduced, and the exhaust gas from the engine is better purified.

Figure 2:
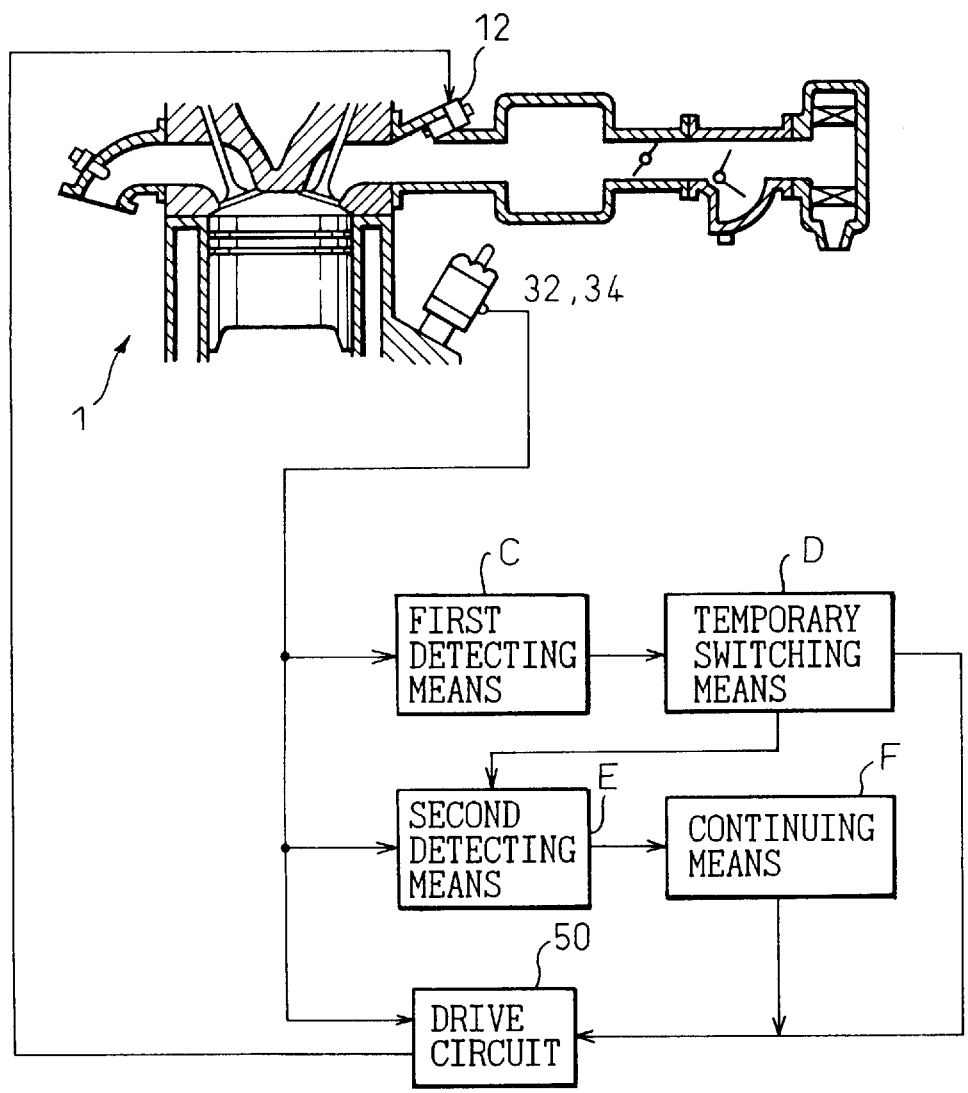
FIG. 2 is a diagram of a basic constitution according to a second aspect of the invention.
Figure 10:
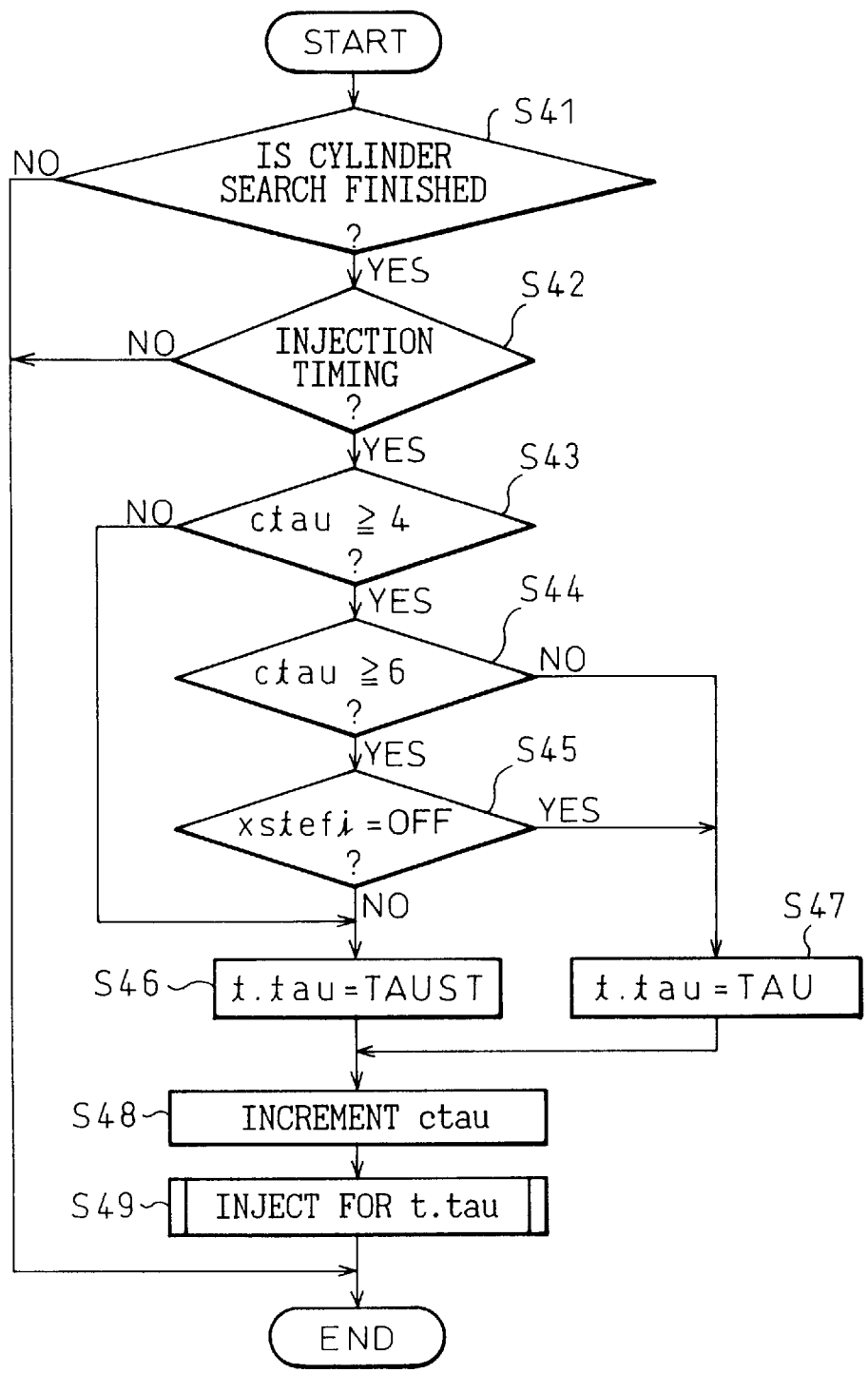
FIG. 10 is a flowchart of a fuel injection routine according to a second aspect of the invention.

FIG. 10 is a flowchart of a fuel injection routine according to a second aspect of the invention. This routine is executed every 30 degrees in crank angle (30° CA). This routine is started when the ignition switch is turned on and ends when the ignition switch is turned off. The first detecting means C, the temporary switching means D, the second detecting means E and the continuing mean F explained with reference to FIG. 2 are respectively carried out by executing step S43, step S44, step S45 and steps S44 to S46 respectively shown in FIG. 10.

First, in step S41, it is determined whether or not the cylinder search has been finished in the same way as step S1 in FIG. 7. After the 30 CA interrupt routine is started, if it is determined that the cylinder search has finished in step S41, the process proceeds to step S42, if not, the process ends.

In step S42, it is determined whether or not the searched cylinder is at the injection timing based on output signals of the crank angle sensor 32 and the reference crank angle sensor 34. If it is determined YES in step S42, the process proceeds to step S43, if not, the process ends.

The steps S43 to S49 are provided to execute the following:

(1) The cranking injection based on TAUST is carried out once to each cylinder by steps S43 and S46 when ctau<4.

(2) The post-cranking injection based on TAU is carried out to two consecutive cylinders after the cranking injection based on TAUST to each cylinder has completed by steps S43, S44 and S47 when 4≦ctau≦6.

(3) The cranking injection based on TAUST is carried out to cylinders when xstefi is ON, namely, after the engine speed NE is equal to or more than 400 RMP (NE≧400 RPM) by steps S43, S44, S45 and S46 when ctau≧6.

(4) The post-cranking injection based on TAU is carried out to cylinders when xstefi is OFF, namely, after the engine speed NE is less than 400 RPM (NE<400 RPM) by steps S43, S44, S45 and S47 when ctau≧6.

Each process of steps S43 to S49 will be explained below.

In step S43, it is determined whether or not cranking injection based on TAUST in each cylinder has been completed once. This is accomplished by an injection execution counter ctau. If ctau>4 in step S43, the process proceeds to step S44, if ctau<4 in step S43, the process proceeds to S46. In step S44, ctau≧6 is checked, if ctau≧6, the process proceeds to step S45, if ctau<6, the process proceeds to S47. In step S45, an engine start-up completion judgement flag xstefi representing the engine is post-start condition, namely, that the engine speed is over the reference speed, for example, 400 RPM, is checked. If the flag xstefi is ON, the process proceeds to step S46, if the flag xstefi is OFF, the process proceeds to step S47. In step S46, t.tau is calculated based on TAUST, then step S48 is processed. In step S47, t.tau is calculated based on TAU, then step S48 is processed.

In step S48, the injection execution counter ctau is incremented. The counter ctau is initially cleared when the ignition switch is turned on, and counts up every 30 degrees in crank angle after step S41 has determined that the cylinder search has finished. In step S49, the fuel injection amount t.tau calculated in S46 or S47 is injected from each injection valve into each corresponding cylinder.

Figure 11:
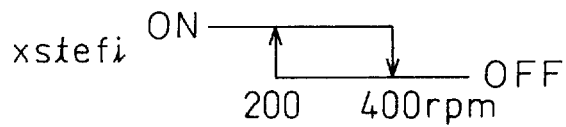
FIG. 11 is a diagram showing an ON-OFF timing of a start up completion judgement flag.

FIG. 11 is a diagram showing an ON-OFF timing of a start up completion judgement flag. As can be seen from FIG. 11, the flax xstefi is set (ON) when the engine is started, and is reset (OFF) when the engine speed is increased more than 400 RPM, namely, the engine start up is completed, then the flag is again set (ON) when the engine speed is decreased below 200 RPM.

Figure 12A:
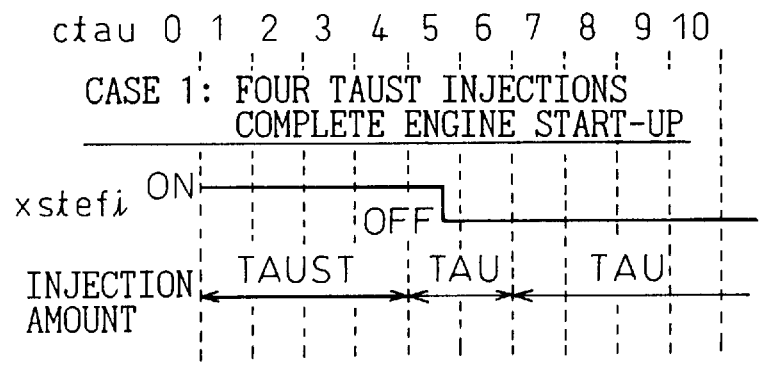
FIG. 12A is a diagram showing a switching pattern of a fuel injection control.
Figure 12B:
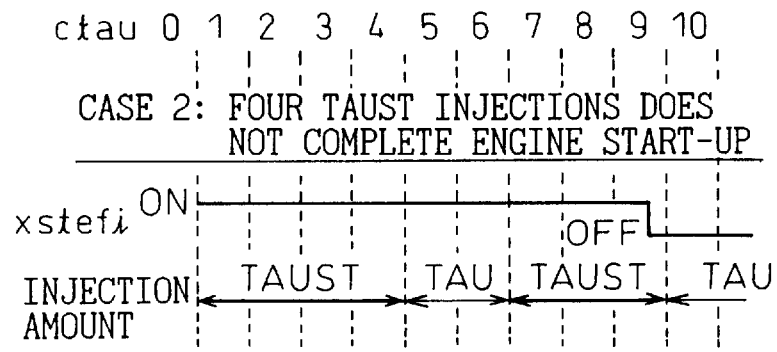
FIG. 12B is a diagram showing another switching pattern of a fuel injection control.

FIGS. 12A and 12B are diagrams showing different switching patterns of fuel injection control. FIG. 12A shows a pattern in a case where the engine can be started by the first four injections that supply fuel once to each cylinder. FIG. 12B shows another pattern in a case where the engine cannot be started by the first four injections.

As shown in FIG. 12A, the flag xstefi is switched from ON to OFF when the engine is started with four injection based on the cranking amount TAUST. Then, regardless the flag xstefi is ON or OFF, the fifth and the sixth injections are carried out based on the post-cranking amount TAU by steps S44, S47 and S49. From the seventh injection, the process proceeds to step S47 as the flag xstefi is OFF, and the injection based on the post-cranking amount TAU is also carried out.

As shown in FIG. 12B, the first to the sixth injections are the same as shown in FIG. 12A, namely, the first four injections are based on TAUST and the fifth and the sixth injections are based on TAU. From the seventh to the ninth injection, the process proceeds to step S46 as the flag xstefi is ON, and the injection based on the cranking amount TAUST is carried out. Then, from the tenth injection, the process proceeds to step S47 as the flag xstefi is OFF, and the injection based on the post-cranking amount TAU is carried out.

As explained above, according to the second aspect of the invention, the first four injections are performed based on the cranking amount TAUST once to each cylinder, the next two injections are performed based on the post-cranking amount TAU, then from the seventh injection, the injection is performed based on the cranking amount TAUST when the flag xstefi is OFF, namely, the engine is not started up, while the injection is performed based on the post-cranking amount TAU when the flag xstefi is ON. In this way, excess fuel is not supplied at the fifth and the sixth injections after the first four injections have finished at the engine start-up so that discharge of unburned HC may be reduced, and the exhaust emission is better purified. Furthermore, when a large amount of fuel is required for the cranking amount TAUST in such a case that a large amount of fuel is deposited on the wall in the intake port due to deterioration with age, loss of battery voltage, poor fuel quality or the like, a required amount of fuel can be supplied without shortage, thereby avoiding failure in engine start-up due to lack of fuel.

Figure 13:
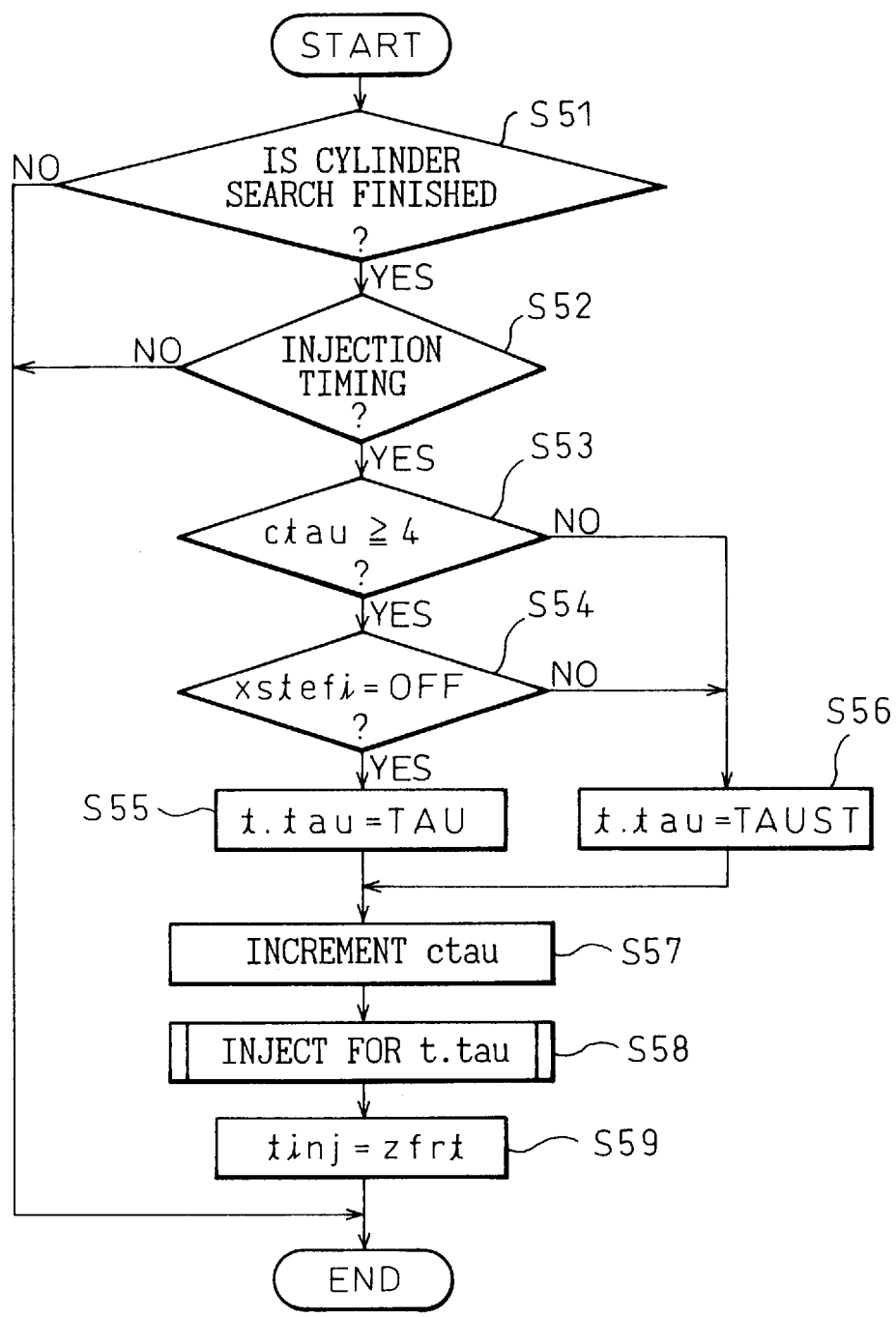
FIG. 13 is a flowchart of a fuel injection routine according to a third aspect of the invention.

FIG. 13 is a flowchart of a fuel injection routine according to a third aspect of the invention. This routine is executed every time the input port receives a signal from the crank angle sensor 32, namely, every 30 degrees in crank angle (30° CA). This routine is started when the ignition switch is turned on and ends when the ignition switch is turned off. In FIG. 13, steps S51 to S53 and steps S55 to S58 respectively correspond to steps S1 to S3 and steps S4 to S7 in FIG. 7, therefore an explanation of these steps is omitted. Steps S54 and S59 only will be explained below.

In step S54, an engine start-up completion judgement flag xstefi is checked, namely, whether or not the engine is started is checked. If the flag xstefi is OFF, the process proceeds to step S55, if the flag xstefi is ON, the process proceeds to step S56.

In step S59, the current time of a free running timer zfrt of CPU is set to the next injection start timing tinj which will be explained later.

Figure 3:
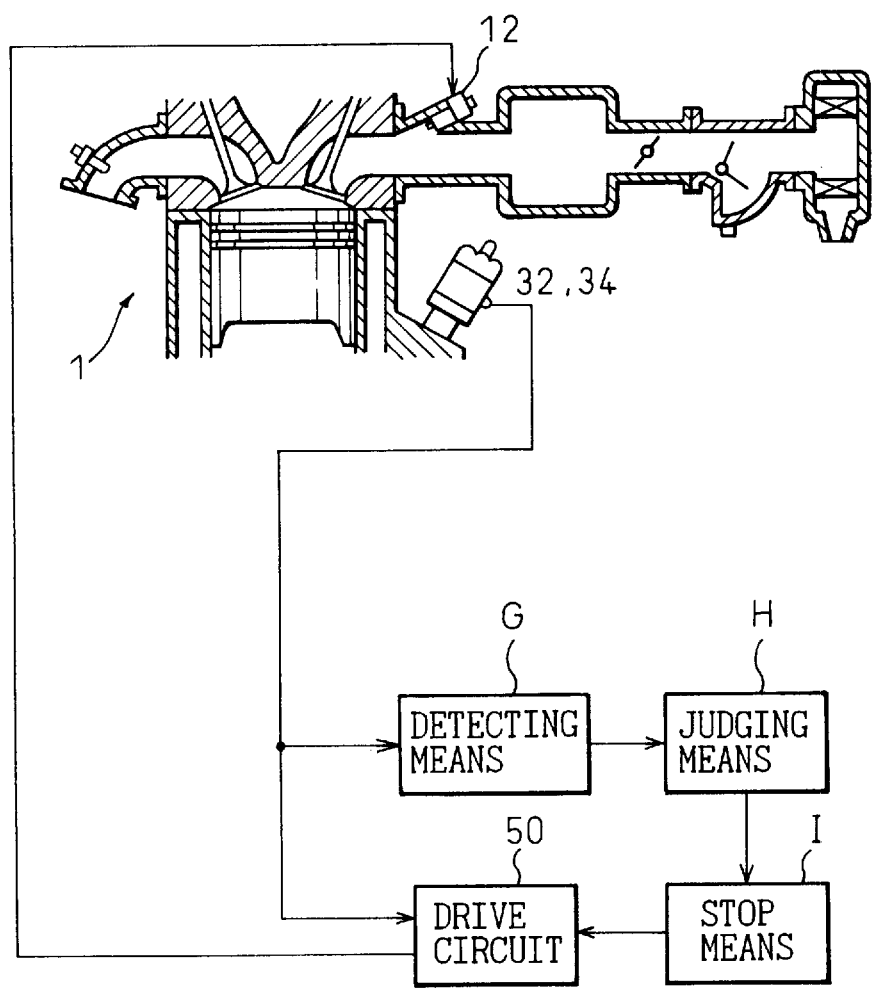
FIG. 3 is a diagram of a basic constitution according to a third aspect of the invention.
Figure 14:
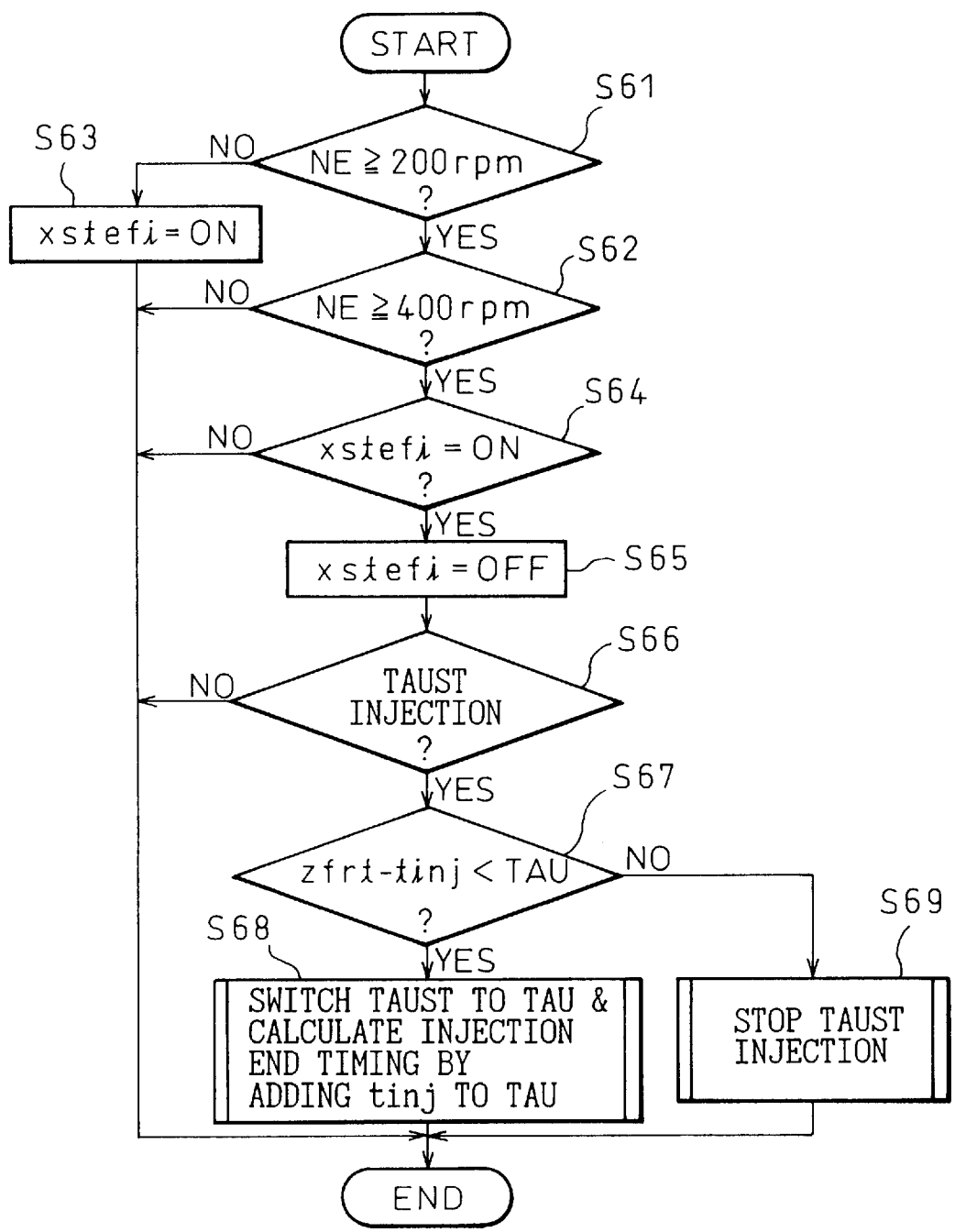
FIG. 14 is a flowchart of processes in a specific case of the fuel injection routine shown in FIG. 13.

FIG. 14 is a flowchart of processes in a specific case of the fuel injection routine shown in FIG. 13. This routine is carried out in the main routine, namely, the routine is executed every 1 mill-second (ms). The detecting means G, a judging means H, and a stop means I explained with reference to FIG. 3 are respectively carried out by executing step S64, step S67, and steps S68 and S69 respectively shown in FIG. 14.

In step S61, whether or not the engine speed NE is equal to or more than 200 RPM is checked, if NE≧200 RPM, the process proceeds to step S62, if NE<200 RPM, the process proceeds to step S63. In step S62, whether or not the engine speed NE is equal to or more than 400 RPM is checked, if NE≧400 RPM, the process proceeds to step S64, if NE<400 RPM, the process ends. In step S63, the flag xstefi, representing that the engine start-up has not completed, is set ON.

In step S64, an engine start-up completion judgement flag xstefi, representing the engine is a post-start condition, is checked. If the flag xstefi is ON, it is determined that the engine start up has completed and the process proceeds to step S65, and if the flag xstefi is OFF, it is determined that the engine start up has not completed and the process ends. In step S65, the flag xstefi is set ON.

In step S66, whether or not the cranking injection based on TAUST is still continued is checked as the flag xstefi is reset to OFF in step S65, namely, as the completion of the engine start-up is confirmed. In step S66, if the result is YES, the process proceeds to step S67, if the result is ON, the process ends.

In step S67, (zfrt—tinj) is calculated, wherein zfrt is the current time of the free running timer zfrt and tinj is the time of the free running timer zfrt previously set as the current injection start timing in step S59 in FIG. 13, and (zfrt—tinj) is compared with TAU. The calculation (zfrt—tinj) means a consecutive time for injecting fuel based on the cranking amount TAUST, therefore, the consecutive time and the post-cranking injection time TAU is compared in step S67. If (zfrt—tinj)<TAU, it is determined that the injection based on TAU has not completed and the process proceeds to step S68, if (zfrt—tinj)≧TAU, it is determined that the injection based on TAU has completed and the process proceeds to step S69. The process in step S67 determines whether or not the fuel injection amount corresponding to TAU by the injection based on TAUST has been injected till the current processing cycle after the flag is reset to OFF in step S65.

In step S68, the injection based on TAUST is stopped, the injection amount is switched from TAUST to TAU, then the current injection end timing is calculated based on TAU as below.

The injection end timing=tinj+TAU wherein, tinj is the current injection start timing calculated in step S59 in FIG. 13 and TAU is a period corresponding to a fuel injection amount to be supplied at the current processing cycle based on TAU. In this way, the fuel injection at the current processing cycle is executed based on TAU.

On the other hand, in step S69, the injection based on TAUST is immediately stopped because the fuel amount corresponding to TAU has already been completed by the injection based on TAUST.

Next, steps S68 and S69 will be explained in detail referring to a prior art shown in FIG. 15.

FIG. 15 is an example of an enlarged time chart showing a switching time of a fuel injection control according to a prior art. In FIG. 15, the abscissa represents time, the ordinate represents the engine speed NE in the upper part, the ON/OFF state of the flag xstefi in the middle part, and the cylinder number from #1 to #4 in the lower part. In the lower part, each ignition timing is indicated by an arrow, each intake stroke is indicated by dots and each injection timing is indicated by oblique lines. The injection control according to a prior art shown in FIG. 15 injects fuel based on the cranking injection amount TAUST from injection valves #1, #3, #4 and #2, in this order, until the engine self-driving state is detected, namely, until the engine speed NE reaches 400 RPM. Then, the engine speed exceeds 400 RPM during injection to #1 cylinder, and the injection continues until the fuel amount based on TAUST has been completely injected. In this case, in a period shown in a circle marked "S" in FIG. 15, namely, in an injection period including the timing $t_c$ when the flag xstefi is switched from ON to OFF, the intake stroke and the injection period to #1 cylinder are overlapped, namely, the injection cannot be finished before the intake stroke starts, thus the fuel injected during this period based on TAUST becomes extra fuel HC and unburned HC is discharged after the start of the engine.

Figure 16A:
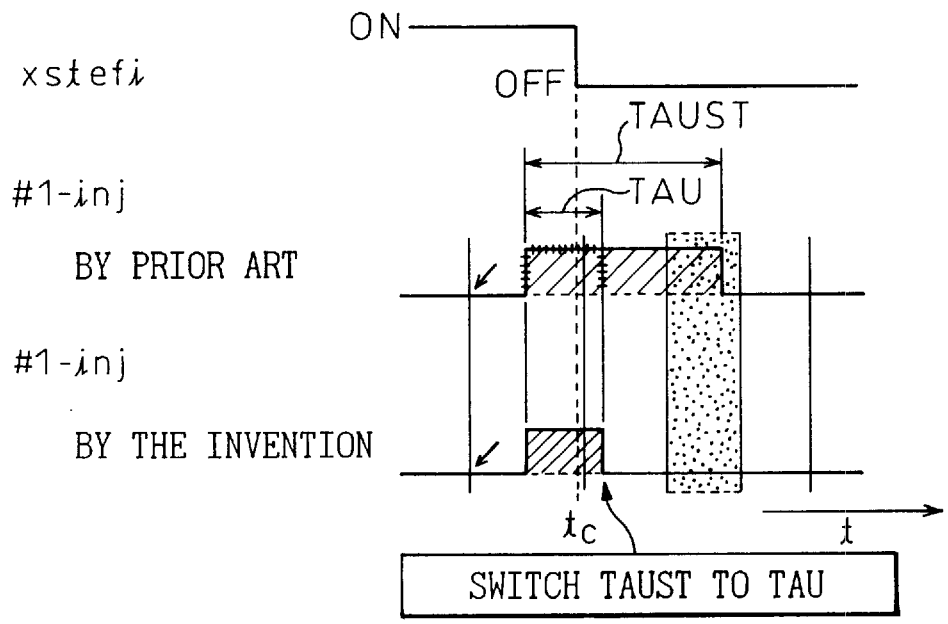
FIG. 16A is an enlarged diagram of a part S shown in FIG. 15 and shows an injection control example according to a third aspect of the invention that switches the fuel injection amount from TAUST to TAU.
Figure 16B:
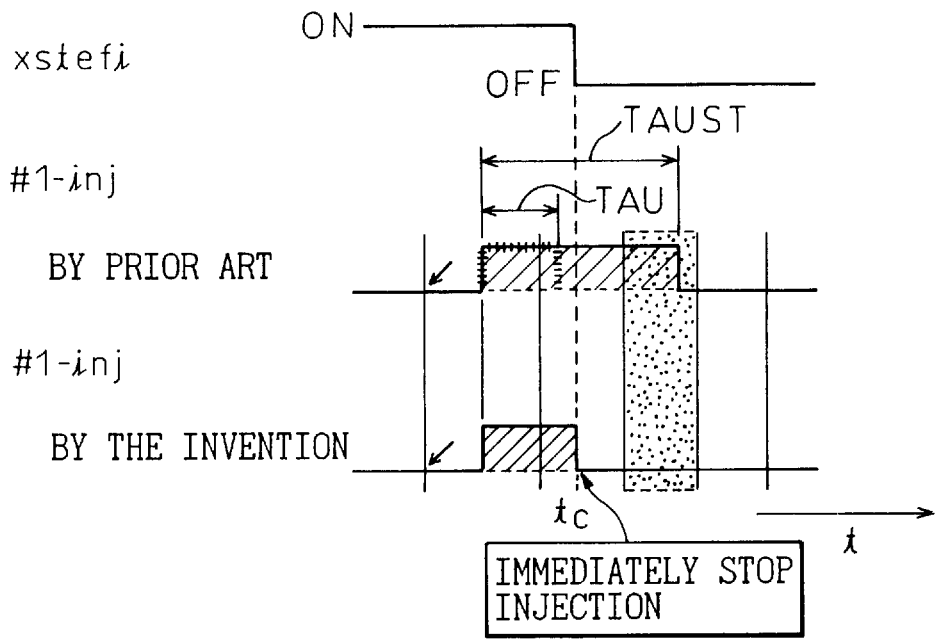
FIG. 16B is an enlarged diagram of a part S shown in FIG. 15 and shows an injection control example according to a third aspect of the invention that stops the fuel injection amount based on TAUST.

FIGS. 16A and 16B are enlarged diagrams of a part S shown in FIG. 15, FIG. 16A shows an injection control example according to a third aspect of the invention that switches the injection from TAUST to TAU, and FIG. 16B shows another injection control example according to a third aspect of the invention that stops the injection based on TAUST.

As explained before, in step S65 shown in FIG. 14, it is determined that the engine start-up is completed when the flag xstefi is switched from ON to OFF at a timing $t_c$ as shown in FIGS. 16A and 16B. At the timing $t_c$, whether or not the injection, based on the cranking amount TAUST, is still continued is checked in step S66 as the flag xstefi is reset to OFF in step S65. If the result is YES in step S66, as in the case of #1 cylinder of which injection period is shown in a circle marked "S" in FIG. 15, the process proceeds to step S67 and if the result is NO in step S66, the process ends.

In step S67, as explained before, the consecutive time of fuel injection based on TAUST (zfrt—tinj) is compared with the post-cranking injection time TAU in step S67. If (zfrt—tinj)<TAU, it is determined that the injection based on TAU has not been completed and the process proceeds to step S68, if (zfrt—tinj)≧TAU, it is determined that the injection based on TAU has been completed and the process proceeds to step S69.

In step S68, the injection based on TAUST is stopped, the injection is switched from TAUST to TAU and the current injection end timing of the injection based on TAU is calculated by adding tinj to TAU, wherein, tinj is the current injection start timing calculated in step S59 in FIG. 13 and TAU is a period corresponding fuel injection amount to be supplied at the current processing cycle. In this way, the fuel injection at the current processing cycle can be executed based on TAU.

On the other hand, in step S69, the injection based on TAUST is immediately stopped because the fuel amount corresponding to TAU has been already completed by the injection based on TAUST.

As explained before, according to the third aspect of the invention, the injection based on TAUST in the intake stroke is stopped when the engine start up completion is detected, thus discharge of unburned HC is reduced, and the engine startability can be improved because the cranking injection amount TAUST is continually injected until the engine is completely started-up.

It will be understood by those skilled in the art that the foregoing descriptions are preferred embodiments of the disclosed apparatus and that various changes and modifications may be made in the invention without departing from the spirit and scope thereof.

I claim:

1. An apparatus for controlling fuel injection in a multicylinder internal combustion engine that controls the opening of fuel injection valves for a period of time on the basis of a cranking amount determined corresponding to engine conditions at the start of the engine and a post-cranking amount determined corresponding to engine conditions after the engine has been started, comprising:

means for detecting that the cranking amount has been injected once to each cylinder;

means for switching the fuel injection amount from the cranking amount to the post-cranking amount after the detecting means has detected that the cranking amount has been injected once to each cylinder regardless of an engine rotational speed.

2. An apparatus for controlling fuel injection in a multicylinder internal combustion engine that controls the opening of fuel injection valves for a period of time on the basis of a cranking amount determined corresponding to engine conditions at the start of the engine and a post-cranking amount determined corresponding to engine conditions after the engine has been started, comprising:

first detecting means for detecting that the cranking amount has been injected once to each cylinder;

means for temporarily switching the fuel injection amount for at least one of the cylinders from the cranking amount to the post-cranking amount after the first detecting means has detected that the cranking amount has been injected once to each cylinder;

second detecting means for detecting that the engine start has been completed after the fuel injection amount has been temporarily switched by the temporary switching means; and continuing means for continuing the fuel injections based on the cranking amount until the second detecting means detects the completion of the engine start-up.

3. An apparatus for controlling fuel injection in a multicylinder internal combustion engine that controls the opening of fuel injection valves for a period of time on the basis of a cranking amount determined corresponding to engine conditions at the start of the engine and a post-cranking amount determined corresponding to the engine conditions after the engine has been started, comprising:

means for detecting that the engine start-up has been completed;

means for judging whether the post-cranking amount of fuel has been injected when the completion of the engine start-up is detected by the detecting means while the cranking amount of fuel is being injected; and means for immediately stopping the fuel injection based on the cranking amount when the judging means judges that the post-cranking amount has been injected, and for stopping the fuel injection based on the cranking amount when the post-cranking amount has been injected and the judging means judges that the post-cranking amount has not yet been injected.

4. A method for controlling fuel injection in a multicylinder internal combustion engine that controls the opening of fuel injection valves for a period of time on the basis of a cranking amount determined corresponding to the engine conditions at the start of the engine and a post-cranking amount determined corresponding to the engine conditions after the engine has been started, comprising the steps of:

detecting, independently of an engine rotational speed, a completion of fuel injections at the start of the engine by detecting that the cranking amount has been injected once to each cylinder; and switching the fuel injection amount from the cranking amount to the post-cranking amount after detecting the completion of the fuel injections.

5. A method for controlling fuel injection in a multicylinder internal combustion engine that controls the opening of fuel injection valves for a period of time on the basis of a cranking amount determined corresponding to the engine conditions at the start of the engine and a post-cranking amount determined corresponding to the engine conditions after the engine has been started, comprising the steps of:

detecting a completion of fuel injections at the start of the engine by detecting that the cranking amount has been injected once to each cylinder;

temporarily switching the fuel injection amount for at least one of the cylinders from the cranking amount to the post-cranking amount after detecting the completion of the fuel injections;

detecting the engine start completion after the fuel injection amount is temporarily switched from the cranking amount to the post-cranking amount; and continuing the fuel injections based on the cranking amount until the completion of the engine start-up is detected.

6. A method for controlling fuel injection in a multicylinder internal combustion engine that controls the opening of fuel injection valves for a period of time on the basis of a cranking amount determined corresponding to the engine conditions at the start of the engine and a post-cranking amount determined corresponding to the engine conditions after the engine has been started, comprising the steps of:

detecting that the engine start-up has been completed;

judging whether the post-cranking amount of fuel has been injected when the completion of the engine start-up is detected while the cranking amount of fuel is being injected;

immediately stopping the fuel injection based on the cranking amount when it is judged that the post-cranking amount has been injected at the time the completion of the engine start-up is detected; and stopping the fuel injection based on the cranking amount when the post-cranking amount has been injected when it is judged that the post-cranking amount has not yet been injected at the time the completion of the engine start-up is detected.

* * * * *